Figure 5:
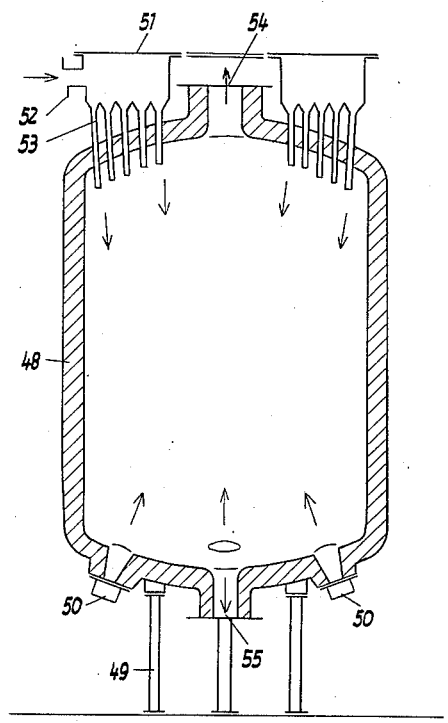

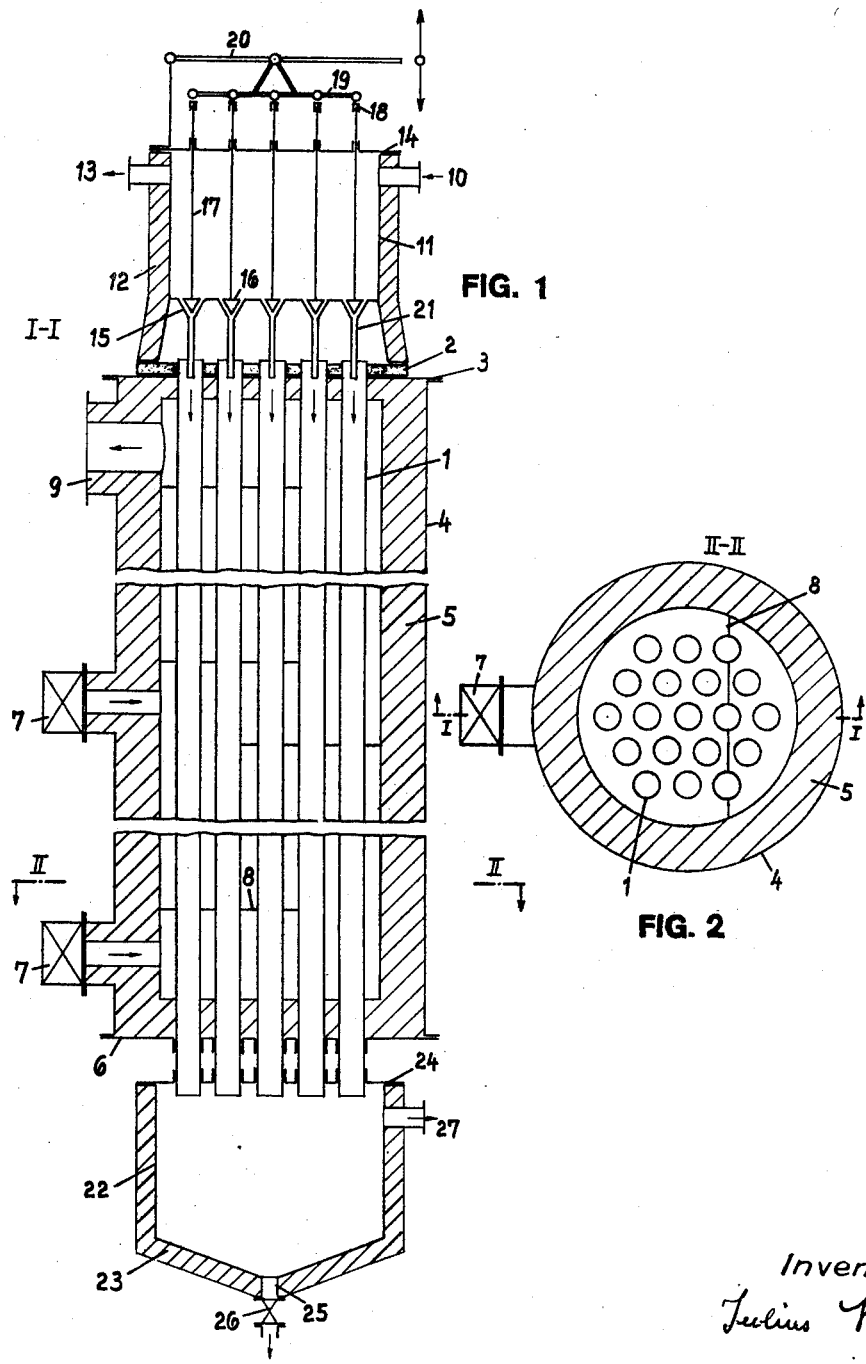

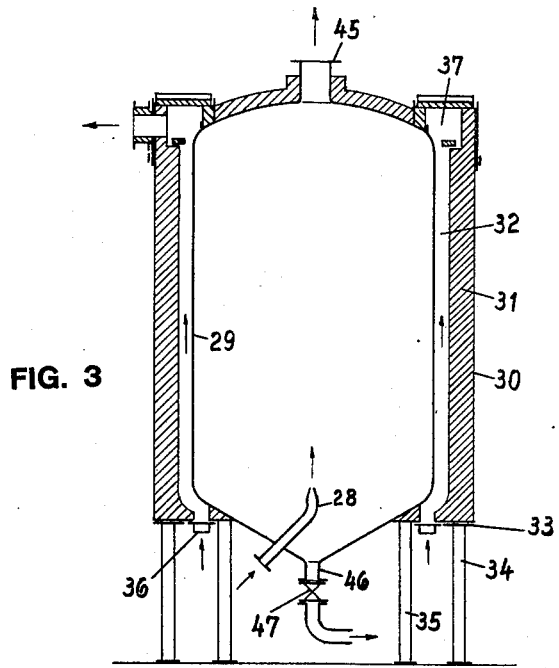
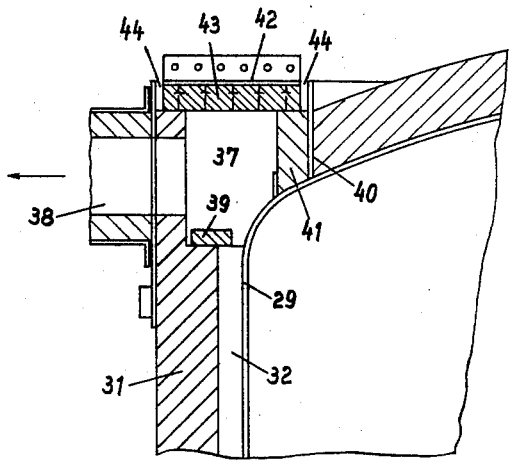

United States Patent Office 2,758,061
Patented Aug. 7, 1956

2,758,061

VAPORIZATION AND CRACKING OF LIQUIDS OR MIXTURES OF LIQUIDS, MORE PARTICULARLY OF HYDROCARBONS

Julius Geller, Bad Homburg, vor der Hohe, Germany, assignor to Rütgerswerke-Aktiengesellschaft, Frankfurt am Main, Germany Application October 28, 1950, Serial No. 192,701

Claims priority, application Germany October 31, 1949

3 Claims. (Cl. 196—47)

The vaporization of liquids is effected by heating them indirectly, either in vessels of large capacity or in a pipe coil of sufficient length, by means of heating gases or liquids. The temperature of the containers or tube walls exceeds the boiling temperature of the liquid by a relatively small amount only, so that a correspondingly long time is required for the heating and vaporization of the liquid.

In other cases the liquid to be vaporized is heated directly, an immersion burner being arranged inside a vessel, of fairly large capacity, which is filled with the liquid to be vaporized. In these cases the heating gases leaving the burner do indeed come into immediate contact with the liquid, but the liquid is heated and vaporized only gradually because the heat content of the burnt gases is very small in relation to the heat absorption capacity of the surrounding liquid.

In order to reduce the time taken to heat and vaporize the liquid to a small fraction of the time required heretofore, in the new method the liquid, preheated if necessary, is to be led into chambers the walls of which are heated, by direct or indirect heating, to a temperature far above the boiling temperature of that component of the mixture of fluids which has the highest boiling point. Therefore if the new method is used for the vaporization of hydrocarbons with a relatively high boiling point, for example, then the walls of the vaporization chamber are to be given a temperature of 1000° C. or higher.

A further and very important characteristic of the new method consists in the fact that the liquid is introduced into a heater, or into several heaters arranged in parallel, in the form of drops, streams or bands of relatively small thickness. Because of the breaking up of the liquid or mixture of liquids into small volumes the heating time and therefore also the vaporization time is now reduced to a small fraction of the time required heretofore. In general the drops, streams or bands used in carrying the method into effect are to have a thickness of only a few millimetres. If necessary the liquid may actually be atomized.

When the walls of the heater are at extremely high temperatures the danger arises that deposits will form which will impair the transfer of heat or the radiating power of the walls, and therefore in the new method the liquid is to pass through the heater by falling freely. In order to prolong the time during which the liquid remains in the heater it may prove advantageous to spray the liquid vertically into the heater from below by means of a certain excess pressure. In this case the particles of liquid first move upwards inside the heater and are then turned downwards again in accordance with the gravitational force acting on them. This practically doubles the time during which they remain in the heater. Another possible method of increasing this time consists in leading the liquid into a stream of gas rotating at a relatively high speed inside the heater.

In many cases the liquid may be vaporized by direct heating without any detrimental results arising from the mixing of the vapours, freed in the process, with the burnt gases. To prolong the time during which the particles of liquid remain inside the heater when direct heating of this kind is effected, the burnt gases should flow in the opposite direction to that of the freely falling liquid. At the esame time the sensible heat of the burnt gases is more effectively exploited by carrying the counter-current principle into effect.

In this invention, the shifting of the heating and vaporization process to high and extremely high temperatures is intended not only to reduce the heating and vaporization time to a fraction of the time necessary heretofore, but also at the same time to effect, if necessary, a decomposition of the vapours or of part of the vapours. The method may be carried into effect in various temperature stages, depending on the liquids that are being vaporized, it being possible to lead off part of the vapours after each temperature stage in order to prevent further decomposition of this part of the vapours.

If hydrocarbons are vaporized according to the new method, then, depending on the nature and the characteristics of the hydrocarbons, the highly heated walls of the heater may themselves exercise a catalytic effect on decomposition. Thus for example in the vaporization of aliphatic hydrocarbons it has been found that the iron wall of the vaporization tube, or the hammer scale layer covering the wall, prevents to a great degree the formation of carbon. In carrying the new method into effect, however, provision has also been made for supplying the heater with a catalyst.

At high working temperatures there is the danger that considerable heat stresses will be produced within the apparatus if the temperature distribution is uneven. Moreover cracks or other damage occurs if the free thermal expansion of the highly heated parts is in any way hindered. The work is therefore preferably carried out in installations provided with one or more and preferably cylindrical heaters arranged in parallel. If the liquid is to be heated by indirect heating, then these heaters are surrounded by a jacket for guiding the heating gases. Provision is made to enable the walls of the heaters to expand, freely and without hindrance, in relation to the surrounding jacket.

Since the heat radiation which causes vaporization is largely dependent on the wall temperature, particular attention must be paid to the even heating of the apparatus. For this purpose the heating gases which flow round the walls of the heater should be admitted to these walls evenly. Generally, on the other hand, the fresh hot gases flowing out of the burner are led in and the waste gases are led out on one side only, that is to say asymmetrically. According to the present invention, therefore, collecting channels are provided for the outlet of the heating gases, and if necessary also for the inlet, these collecting channels being connected with the heating-gas guiding channels by means of throttling grids. The openings of the throttling grid are so adjusted that there is a completely even drop in pressure throughout the system of channels for the heating gases.

The apparatus for carrying the new method into effect may with advantage also be used only for the decomposition of hydrocarbon vapours. In this case the liquid hydrocarbons are previously brought to the vaporization temperature, whereupon the vapours which then become free are led through the highly heated apparatus described above. After leaving this apparatus the vapours may then be subjected to fractional condensation in a fractionating column known in itself.

Various constructional examples of apparatus for carrying the new method into effect are illustrated in the accompanying drawings, in which:

Figure 1 shows a tubular heater in central longitudinal sectional elevation on the line I—I in Figure 2; while Figure 2 shows a horizontal section on the line II—II in Figure 1; and Figures 3, 4 and 5 show modifications.

The tubular heater consists of numerous vertically arranged tubes 1, which are beaded or welded to a tube plate 2. The tube plate rests on a cover 3, which closes a heating jacket 4 at the top. In view of the high working temperatures, which may be above 1000° C., the jacket 4 is provided with relatively thick internal insulation 5.

The jacket 4 is closed at the bottom by a cover 6. This cover is provided with a stuffing box for each tube, so that all the tubes when heated can expand downwards freely and without hindrance.

For heating the nest of tubes, one, two or more gas-burners 7, the number depending on the height, are arranged on the jacket. The hot burnt gases flow round the tubes 1, and by means of deflection plates 8 are compelled continually to change their direction to flow inside the apparatus. The waste gases, which are still at a fairly high temperature, are led away through a branch 9. Their sensible heat may advantageously be utilized in a known way for preheating the air for combustion and the liquid to be vaporized.

The liquid is taken from a storage container and conveyed through a branch 10 to a distributing vessel 11. This vessel is also provided with insulation 12.

In order to ensure a constant admission of liquid into the tubular heater the level of the liquid in the distributing vessel 11 is kept always at the same height. For this purpose the distributing vessel 11 is provided with an overflow branch 13. The distributing vessel is closed at the top by a cover 14. The bottom of the distributing vessel is provided with outlet orifices 15, one for each of the tubes. Each orifice can be closed by a valve 16, which is moved up and down by means of a rod 17. Each of the rods 17 is connected, through an adjusting device 18, to a common cross head 19, which can be moved up and down by a lever 20, which is mounted by means of a pin joint. The height of each individual valve disc can be adjusted by means of an adjusting device 18.

Each orifice 15 is provided with a guiding tube 21 so that the stream of liquid will pass vertically downward into its tube with as little interference as possible. From this guiding tube the liquid emerges into the highly heated tubes 1, in which it is partly or wholly vaporized. Any components which are not vaporized fall through the tubes into a collecting vessel 22, which is provided with insulation 23. The collecting vessel is closed at the top by a cover 24, which is also provided with a stuffing box for each tube. Thus the tubes can expand downwards unhindered. The unvaporized liquid is drawn off through an outlet 25, which can be closed by a valve 26. Any vapours which are still being set free can be drawn off by suction through a branch 27 of the collecting vessel.

The tubes 1 may consist of heat-resistant steel, but it is also possible for them to consist of ceramic materials or of graphite.

If it is desired to vaporize mixtures of liquids in which there are very great differences between the boiling points of the individual components, then according to the invention the mixture of liquids, for instance coke tar, is to be passed through two or more tubular furnaces maintained at different temperatures. In this way it is possible to obtain extensive adaptation to the characteristics of the mixture of liquids at any given time.

A further example of construction is illustrated in Figures 3 and 4. Here the liquid is blown into a heating chamber 29 through a conduit 28 provided with an atomizing nozzle. According to the invention this chamber is heated to a higher temperature, equal to several times the boiling temperature of the liquid. For this purpose the chamber, which is made for instance of ingot steel or a heat-resistant steel alloy, is surrounded by a heating jacket 30 provided with internal insulation 31. Between the internal insulation and the heating chamber there remains an annular gap 32, through which the heating gases flow from bottom to top. The heating jacket rests on a base plate 33, which in turn is supported by uprights 34. The chamber 29 rests on supports 35.

At the base plate 33, gas or oil burners 36 are arranged underneath an annular gap 36. The hot gases produced here flow round the chamber 29 evenly from bottom to top and are collected in an annular channel 37. From this channel the burnt gases are led off through an orifice 38, as may be seen from Figure 4, which is drawn to a larger scale. In order to balance the one-sided pull of the outlet 38, blocks 39 lie on the insulation 31 in the collecting channel 37, and the width of the top end of the annular channel 32 is adjusted by means of these blocks. This ensures that the vertical upward velocity of the burnt gases will remain even round the whole circumference of the chamber.

The collecting channel 37 is closed at the side by a cylindrical wall 40, provided with insulation 41. The cover 42 closing the collecting channel 37 at the top rests on the insulation 31 and 41. A cover 42 is provided with hanging blocks 43 for insulation. In the embodiment illustrated the cover 42 is so narrow that a gap 44 is formed between the said cover and the adjacent walls. This gap is packed by filling with asbestos twine, sand or the like.

The vapours formed are led away through a branch 45 of the chamber 29, as shown in Figure 3, while the liquid that has not been vaporized is drawn off through an outlet 46. This outlet can be closed by a valve 47.

A third embodiment of apparatus for carrying the new method into effect is illustrated in Figure 5. Here the liquid or the mixture of liquids is directly heated and vaporized by being brought into immediate contact with the hot burnt gases. The apparatus consists substantially of an upright cylindrical chamber 48 resting on several supports 49. The walls of the chamber are lined with fireproof blocks. At the bottom of the chamber are arranged several gas burners 50 from which the hot gases flow upwards in an approximately vertical direction.

Above the chamber an annular container 51 is provided for the distribution of the liquid to be vaporized. The liquid comes into this container through a branch 52, and is then led into the chamber through numerous outlet branches 53. These branches may be closed, singly or in groups, by shut-off devices which are not shown in the drawing.

The vapours evolved leave the chamber through an upper branch 54, while the liquid components which do not vaporize are led away through a branch 55.

Although the invention as described is preferably to be used for the treatment of hydrocarbons which are being vaporized and cracked, this method with the same apparatus may also for instance be used exclusively for the cracking of lignite and coal tars or fractions thereof. In this case the apparatus will advantageously be included in the distillation installation, between the still or the heater and the distillation column.

I claim:

1. A method for continuous, at least partial, vaporization of a liquid comprising the step of introducing the liquid in formations of small thickness into at least one heater, the walls of which define an evaporating space, and the step of causing the subdivided liquid to pass freely through the evaporating space at a temperature far above the boiling point of the highest-boiling component of the liquid, in order to avoid formation of solid deposits on the walls of the heater, by contact of the material treated with said walls, and discharging non-evaporated material in liquid condition from the heater, wherein the liquid falls freely through the evaporating space.

2. A method for continuous, at least partial, vaporization of a liquid comprising the step of introducing the liquid in formations of small thickness into at least one heater, the walls of which define an evaporating space, and the step of causing the subdivided liquid to pass freely through the evaporating space at a temperature far above the boiling point of the highest-boiling component of the liquid, in order to avoid formation of solid deposits on the walls of the heater, by contact of the material treated with said walls, and discharging non-evaporated material in liquid condition from the heater, wherein the liquid to be evaporated is caused to freely pass in upward direction and subsequently caused to freely fall through the evaporating space.

3. Apparatus for continuous vaporization and cracking of liquids, according to the method of claim 1, comprising a plurality of cylindrical heaters arranged, in substantially parallel, vertical position, in an insulated heating chamber, through the cover and bottom, respectively, of which the upper and lower end of each heater extends, a stuffing box for the lower end of each heater, in order to allow expansion of the heaters, a supply and distributing vessel for the liquid arranged above the heating chamber, said vessel being provided with adjustable means for individually connecting the vessel with each heater, for the adjustable supply of liquid, in formations of small thickness, and for freely passing the liquid through the interior of the heaters, and a collecting vessel for the liquid discharged from the heaters, said vessel being arranged below the heating chamber and adapted to receive the lower ends of the individual heaters, and means for heating the heating chamber.

References Cited in the file of this patent

UNITED STATES PATENTS

| | | |
|---|---|---|
| 1,662,142 | Braun | Mar. 13, 1928 |
| 1,806,997 | Joseph | May 26, 1931 |
| 1,989,927 | Houdry | Feb. 5, 1935 |
| 2,041,957 | Reis | May 26, 1936 |